United States Patent [19]

Kitazaki et al.

[11] Patent Number: 5,196,232
[45] Date of Patent: Mar. 23, 1993

[54] MANUFACTURING METHOD OF BASE HEAT TRANSFER MATERIAL WITH POROUS SURFACE

[75] Inventors: Kuraki Kitazaki; Youichi Hisamori, both of Amagasaki, Japan

[73] Assignee: Mitsubishi Denki Kabushiki Kaisha, Tokyo, Japan

[21] Appl. No.: 711,090

[22] Filed: Jun. 6, 1991

[30] Foreign Application Priority Data

Jun. 7, 1990 [JP] Japan .................. 2-150772

[51] Int. Cl.[5] .................. B05D 1/12
[52] U.S. Cl. .................. 427/180; 427/216; 427/217; 427/376.8; 427/443.1; 205/224
[58] Field of Search .......... 427/180, 216, 217, 376.7, 427/190, 191, 192, 376.8, 443.1; 205/224

[56] References Cited

U.S. PATENT DOCUMENTS

| | | | |
|---|---|---|---|
| 3,753,757 | 8/1973 | Rodgers et al. | 427/183 |
| 4,064,914 | 12/1977 | Grant | 165/133 |
| 4,358,485 | 11/1992 | Kern et al. | 427/376.8 |
| 4,447,501 | 5/1984 | Shigeru et al. | 428/570 |

FOREIGN PATENT DOCUMENTS

| | | |
|---|---|---|
| 59-150659 | 8/1984 | Japan . |
| 63-286533 | 11/1988 | Japan . |
| 63-286534 | 11/1988 | Japan . |
| 1123685 | 8/1968 | United Kingdom . |
| 1217004 | 12/1970 | United Kingdom . |
| 1444130 | 7/1976 | United Kingdom . |

*Primary Examiner*—Michael Lusignan
*Assistant Examiner*—Benjamin L. Utech
*Attorney, Agent, or Firm*—Birch, Stewart, Kolasch & Birch

[57] ABSTRACT

A method for manufacturing a heat transfer surface is disclosed wherein the surface of powder or string-shaped copper core material is coated with a coating material of a nickel compound or silver so as to form a coat treatment material which is deposited on a substrate. The coating material has a lower fusing point than the core material, and the coat treatment material is heated to a temperature between the fusing points of the core material and the coating material such that only the coating material is caused to fuse to the substrate so as to form a porous heat transfer material which exhibits improved bending strength.

26 Claims, 6 Drawing Sheets

FIG. 5(a)
FIG. 5(b)
CONVENTIONAL ART
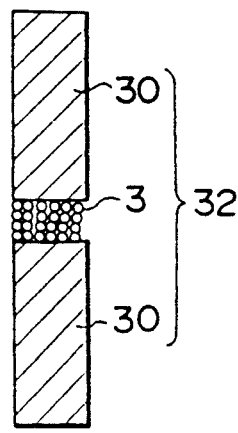
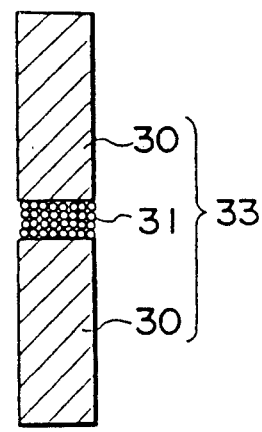
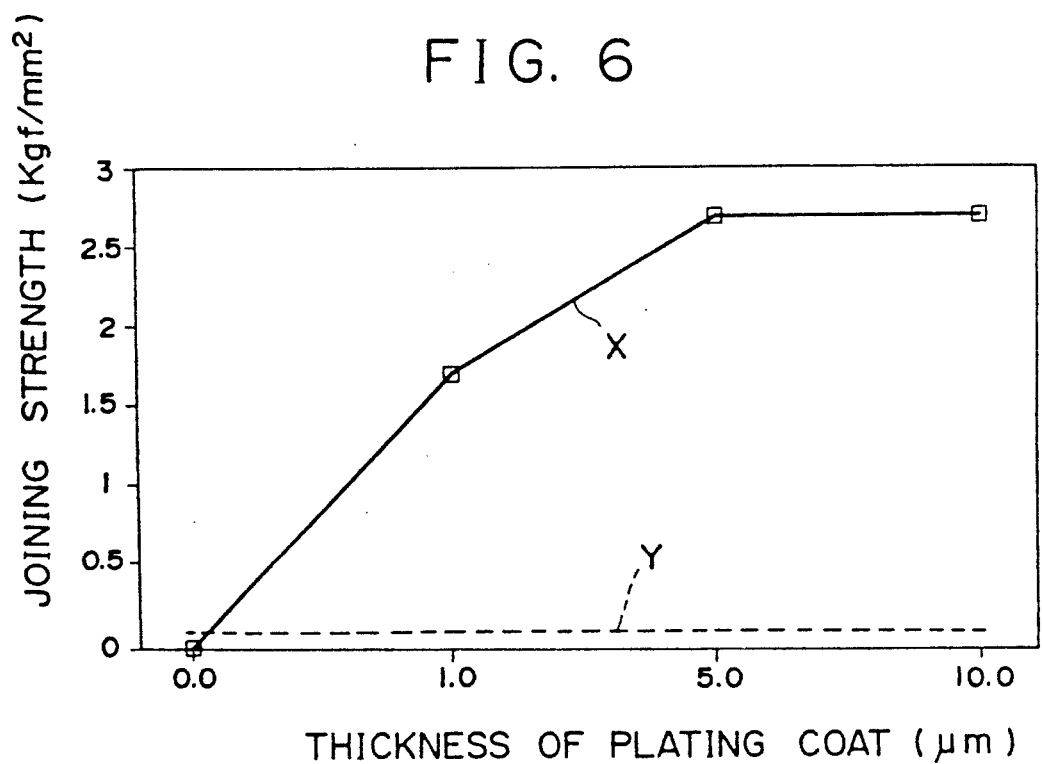
FIG. 6

MANUFACTURING METHOD OF BASE HEAT TRANSFER MATERIAL WITH POROUS SURFACE

BACKGROUND OF THE INVENTION

1. Field of the Invention

This invention relates to a method of manufacturing of base material particles with a porous surface by joining a number of core materials (particles), which can be used, for example, as an ebullition heat transfer surface.

2. Description of the Related Art

A method of manufacturing an ebullition heat transfer surface will be explained as an example of base material particles with a porous surface.

As is well known, the quantity of heat Q (Kcal/h) propagated from a heat transfer surface to the adjoining liquid is calculated by the following formula:

$$Q = a \cdot \lambda \cdot \Delta$$

where a is the transfer rate (Kcal/m²h °C.) based on ebullition, $\lambda$ is the surface area (m²) of the heat transfer surface, and $\Delta$ is the difference (°C.) between surface temperature Tw (°C.) of the heat transfer surface and the temperature T(°C.) of the liquid.

A heat transfer surface with good heat transfer characteristics is defined as a surface where a small temperature difference ($\Delta T$) causes a large heat transfer from the transfer surface to another material (for example the liquid). In other words, a heat transfer surface with good heat transfer characteristics can be defined as one with a large $a \cdot \lambda$ value in the above formula. A conventional method adopted to increase the heat transfer area $\lambda$ is to attach fins to the heat transfer surface, or to roughen the heat transfer surface with a sandblast.

In order to increase the heat transfer rate, a porous surface is used based on the following assumption. The assumption is that, with an ebullition phenomena, the governing factor of the heat transfer is the movement of liquid and steam surrounding the heat transfer area, especially the effect of disturbances and latent heat of liquid caused by steam bubbles leaving the heat conducting area which makes the ebullition heat transfer ratio a far greater than the effect of the convective heat transfer discussed above without generation of steam bubbles (without phase change). For example, the forced convection heat transfer ratio of air is approximately 100 (Kcal/m²h °C.), where the ebullition heat transfer ratio of water is around 10,000 (Kcal/m²h °C.). Because the steam bubbles originate from the liquid adjoining the heat transfer surface, fresh liquid must be supplied to the heat transfer surface after the generation of the steam bubbles, preventing a sudden decrease of the heat transfer ratio a due to film ebullition, where dried steam covers the heat transfer surface.

Therefore, in order to increase the ebullition heat transfer ratio a the number of bubble generation points on the heat transfer surface must be increased and liquid must be constantly supplied to the ebullition surface. On a porous surface, the steam in the cavities forms a bubble core and the cavities are connected inside the porous layer, which supplies fresh liquid to the bubble generation points and increases the heat transfer ratio a.

FIG. 12 is a cross-sectional view of a conventional heat transfer surface with porous surface, which has been manufactured in the following manner. Metal particles (1) that consist of sintered metal and bond (such as phenol aldehyde resin) are mixed and coated on the smooth heat transfer body (2); the above particles are layered in a porous manner and heated to a high temperature; the metal particles are sintered on the heat transfer body (2); and heated again to reduce and remove the bond. In this way the porous layer (31) is made to form a porous surface (41) in which a large number of cavities (5) may contain steam.

FIG. 13 is an example of a cross-sectional view of a porous heat transfer area shown in Japanese Patent Publication sho 61-610. It has an appropriate number (one in the case of FIG. 13) of core materials (particles) (7) (for example metal such as copper or nickel, inorganic material such as glass, or polymers like styrene) on the surface of the heat transfer body (2). The core material is dipped in, for example, copper plating liquid, which forms a metal coat (8). With the metal coat, the above-mentioned core material (particle) (7) is retained on the heat transfer body (2), which forms the porous layer (31) forming the porous surface (41).

The conventional porous surface (41) formed with the sintered metal (1) described in FIG. 12 is suitable for use as an ebullition heat transfer surface. Process control of homogeneous mass-production of the porous surface, however, becomes complex because control of the atmosphere and bonding material during sintering is difficult, and the shape is complex since the metal particles are melting each other.

The other conventional method described in FIG. 13 also has problems. The joining strength among the core material (particles) and between the heat transfer body and between individual core material (particles) is weak, which causes separation of the core material (particles) (7) due to thermal expansion or bending of the heat transfer body. Moreover, large scale plating instrumentation is necessary to dip the heat transfer body for mass-production.

SUMMARY OF THE INVENTION

The objective of the present invention is to solve the above-mentioned problems. The present invention enables mass-production of the heat transfer body, because the joining of the core material particles and the heat transfer body and the core material particles is strengthened and bending can be utilized.

Another object of the present invention is to obtain a manufacturing method of a porous base material which can utilize the characteristics such as the heat transfer characteristics of the core material.

Another object of the present invention is to obtain a manufacturing method of a porous base material which can utilize the characteristics of the coating material.

A further object of the present invention is to obtain a manufacturing method of a porous base material which strengthens the bond with the base material.

The base material with a porous surface of the present invention is manufactured in the following manner: (1) coat treatment material is obtained by coating the core material with coating material having a lower fusing point than the core material; (2) a number of pieces of the coat treatment material are layered on the body material having a higher fusing point; (3) the body material is heated to a temperature lower than the fusing point of the body material but higher than the fusing point of the core material; and (4) the coat treatment material is fused together and with the body material.

A manufacturing method of a base material with a porous surface, in another embodiment of the present invention, is conducted in the following manner: (1) coat treatment material is obtained by coating the core material with coating material having a lower fusing point than the core material; (2) a number of pieces of the coat treatment material are layered on the body material having a higher fusing point; (3) the body material is heated to a temperature lower than the fusing point of the body material but higher than the fusing point of the core material, the coating material is fused and gathers about the coat treatment material at the adjoining points between the coat treatment material particles. Thus, a part of the surface of the core material is uncovered and the coat treatment material and the coating material are fused together and with the base material.

A manufacturing method of a base material with a porous surface, which is another embodiment of the present invention, is conducted in the following manner: (1) coat treatment material is obtained by coating the core material with coating material having a lower fusing point than the core material; (2) a number of pieces of the coat treatment material are layered on the body material having a higher fusing point; (3) the body material is heated to a temperature lower than the fusing point of the body material but higher than the fusing point of the core material, the coating material is fused and gathers about the coat treatment material at the adjoining points between the coat treatment material particles, thus the coat treatment material and the coating material are fused together and with the base material at the adjoining point without removing the coating.

A manufacturing method of a base material with a porous surface, in still another embodiment of the present invention, is conducted in the following manner: (1) coat treatment material is obtained by coating the core material with coating material having a lower fusing point than the core materia; (2) a number of pieces of the coat treatment material are layered on the body material having a higher fusing point; (3) the body material is heated to a temperature lower than the fusing point of the body material but higher than the fusing point of the core material, the coating material is fused and gathers about the coat treatment material at the adjoining point between the coat treatment material particles.

In the present invention, the core material can be solder material; the coat treatment material is obtained by performing coating treatment with plating or deposition on the coating material; the coat treatment material is layered on the base material, and heated to fuse thereby joining parts of the coating material, which provides a higher joining strength of core material (particles) with each other and with the base material. Because of this, separation of the core material particles from each other and from base material due to thermal expansion or bending can be avoided, which enables easy mass-production of the coat treatment material. Moreover, a conventional furnace with solder can be used for heating, which is also suitable for mass-production.

In another embodiment of the present invention, the characteristics of the core material are effectively utilized by fusing the coating material particles to each other and to the body, after the exposing of part of the surface of the core material.

In another embodiment of the present invention, the characteristics of the coating material are effectively utilized by fusing the core material with the body without removing the covering coat.

In a further embodiment of the present invention, the bonding with the body is strengthened by using a coating treatment material coated with the same coating material as above on a body with higher fusing point.

BRIEF DESCRIPTION OF THE DRAWINGS

The accompanying drawing and its description will facilitate an understanding of the invention. These drawings are given by way of illustration only, thus are not limitative of the present invention, and wherein.

FIGS. 5-(A) and 5-(B) are cross-sectional views that show a specimen joined using the joining method according to the present invention 5(A) and a conventional method 5(B).

FIG. 6 compares the joining strength of a specimen joined by the joining method according to the present invention and by a conventional method, where joining strength (Kgf/mm$^2$) is a function of the thickness of the plating coat (micro m).

DETAILED DESCRIPTION

Figure 1A:
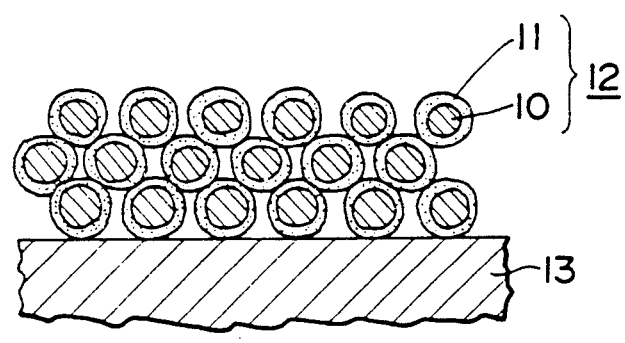
FIGS. 1-(A) to 1-(B) are cross-sectional views of the manufacturing process in one embodiment of the present invention.
Figure 1B:
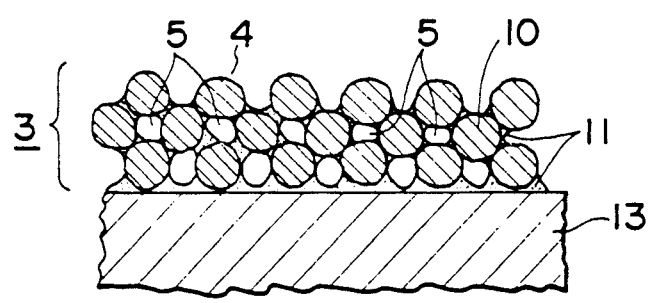

Embodiment 1:

FIGS. 1-(A) and 1-(B) show cross-sectional views of an embodiment of the manufacturing process of the ebullition heat transfer surface of the present invention. In the figures, (3) is a porous layer, (5) is a cavity, (10) is core material, (11) is coating material, and (12) is a coat treatment material which is formed by coating material (11) on the surface of the core material (10), and the heat transfer material (13). As shown in FIG. 1-(A), the core material (10) covered with coating material (11) is layered and heated to fuse the coating material (11). By doing this, the coating material particles (11) are moved and, as shown in FIG. 1-(B), the coat treatment material (12) fuses them together and with a contacting part of the heat transfer material (13). In this manner, the coating material (11) functions as a bond to obtain a porous layer (3) made of core material (10). There are three layers in this figure, and the larger the number of layers of the core material (10), the larger the number of cavities (5). The cavities on the porous surface are also connected to each other inside the porous layer (3).

The base material of the present embodiment will now be explained. The coat treatment material (12) is obtained by using copper particles with diameter from 0.1 to 0.5 mm as core material (10), and placing them into an electroless Ni plating (nickel 87 to 93%, phosphorus 4 to 12%, others 1%) solution at 90° C. for 20 minutes, which forms a Ni plating coat (coating material (11)). In FIG. 1-(A), the thickness of the coating material (11) is exaggerated. Then, the coat treatment material (12) is layered (three times, for example, as in FIG. 1) on the heat transfer material (13) made of copper and sustained by a holder (not shown in the figure). This will be put into a furnace with solder having a vacuum atmosphere (about $10^{-3}$ Torr) and heated to 950° C. for 30 minutes. With heating, the Ni plating coating material (11) fuses and is absorbed into the core material particles (10), then due to surface tension and the wettability of the heat transfer material (13) the surface layer of core material particles which does not contact the heat transfer material (13) is uncovered. After heating, the coating material (11) of Ni plating becomes solid and the base material with porous surface, as shown in FIG. 1-(A), is obtained. With the base material thus obtained, the copper with high heat transfer rate is uncovered by the removal of the Ni plating coat, and can be utilized as a heat transfer surface. Thus, the base material obtained with the present embodiment has a porous surface and can utilize the characteristics of the core material (10) (heat transferability of copper, in this embodiment). Furthermore, Ni realizes firm joining among the core material particles and with the heat transfer material (13).

Embodiment 2

In embodiment 2, for the copper particles of the core material, treatment material (12) having Ni plating of 3 to 100 μm is used. Other steps are the same as embodiment 1. With this embodiment, a strong base material with a porous surface is obtained as with embodiment 1.

Embodiment 3

Figure 2:
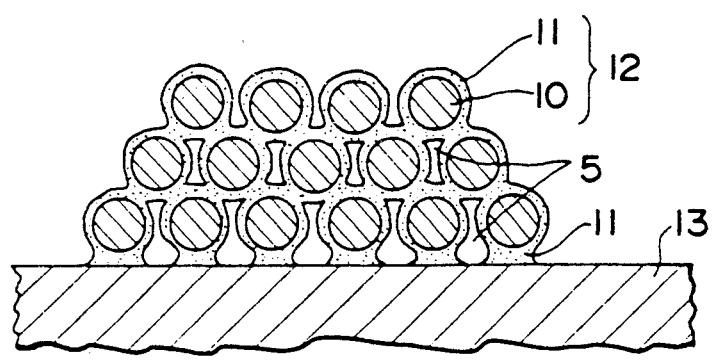
FIG. 2 is a cross-sectional view of a base material with porous surface in another embodiment of the present invention.

In embodiment 3, for the copper particles of the core material, coat treatment material (12) having Ni plating of about 10 μm is used. Other parts are the same as embodiment 1. FIG. 2 shows a cross-sectional view of the state after heating in embodiment 2. The Ni plating coat, the coating material, has not been removed from the copper surface and remains on the core material (10). The base material of embodiment 3 can be utilized, where corrosion resistivity is desired and material with low corrosion resistivity like iron power is used for the core material (10), Ni plating can be used as a coating material (11) which has good corrosion resistivity. In this case, the heat transfer body is required to be the material with good corrosion resistivity.

Embodiment 4

Figure 3A:
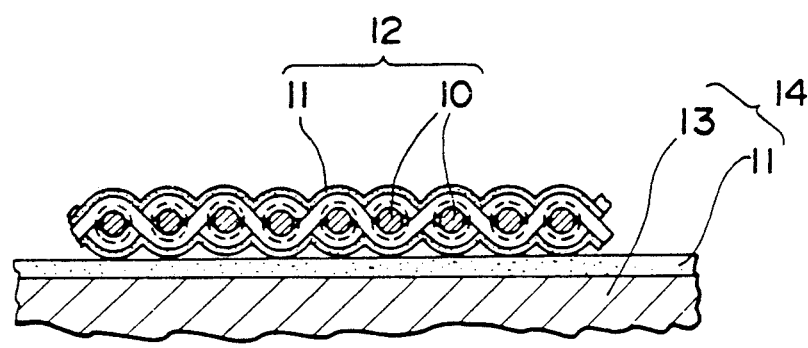
FIGS. 3-(A) and 3-(B) are cross-sectional views of the manufacturing process in another embodiment of the present invention.
Figure 3B:
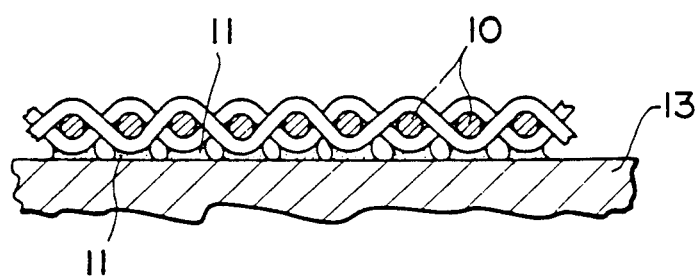

FIGS. 3-(A) and 3-(B) are cross-sectional views of another embodiment of the method of the present application. FIG. 3-(A) shows the state before heating where fiber shaped coating process materials are layered on the heat transfer material, and 3-(B) shows the state after heating where the heat transfer material with the process material layer is heated and the coating material are fused together and with the heat transfer material. In this embodiment, the core material (10) made of fiber cloth (copper mesh) having copper wire of 0.05 to 0.4 mm diameter, and the core material (10) is covered with a coating material (11) of silver of 3 micrometers using deposition or plating. On the other hand, the surface of the heat transfer body (13) made of copper is also coated with material (11) of silver of about 2 μm using plating or the like to obtain the coating treatment base material (14). On the surface of the coating treatment base material (14), coating treatment material (12) made of fiber clothe is layered (in FIG. 3 it is single layered.) and heated at 1000° C. for 30 minutes in a furnace filled with an inactive atmosphere. With the heat, the silver coating material (11) on the surface of the heat transfer body (13) fuses, and the surface tension of the coating treatment material (12) made of fiber cloth causes the coating material (11) to move from the unadjoining part to the adjoining part. Therefore, after heating, the coating treatment material (12) and the coating treatment base material (14) fuse firmly. Fiber cloth is fused together in such a way that the coating material (11) does not cover the fiber cloth mesh of the core material (10) and the copper surface will be uncovered, as is the case in embodiment 1.

Embodiment 5

Figure 4:
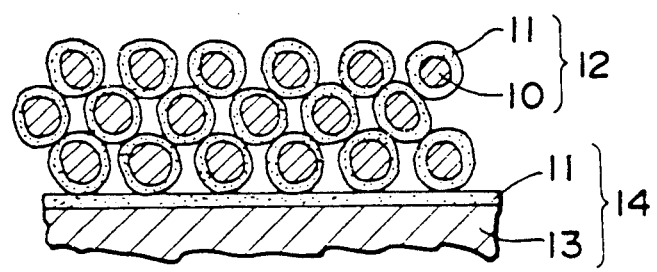
FIG. 4 is a cross-sectional view showing the situation where a number of coating treatment material particles layers according to another embodiment of the present invention are layered on a base material.

In embodiment 5, coating treatment base material (14) as with embodiment 4 is used instead of the heat transfer body (13) of embodiment 1. Otherwise, it is the same as embodiment 1. FIG. 4 shows the state before heating where a number of coating treatment materials (12) are layered on the coating treatment base material. (14) Using coating treatment base material (13) coated with coating material (11) strengthens the fusion of the coating treatment material (12) and base material, even when core material (10) is made of copper particles.

The process of fusing in the present invention will now be explained.

First, the role of the Ni plating coating material (11), is explained. The plating layer obtained by electroless Ni plating contains a tiny amount of phosphorus which lowers the fusing point of nickel and is quite similar to solder (BNi-6 Ni:89%, p:11%). Therefore, the joining of the coating treatment material particle (12) with each other and with the heat transfer body (13) is almost as strong as solder.

The joining strength of the base material according to the present invention is compared with that according to a conventional manufacturing method. FIG. 5-(A) shows a cross-sectional view of a specimen obtained by the joining method according to the present invention, and FIG. 5-(B) shows a cross-sectional view of a specimen obtained according to a conventional method. As shown in FIG. 5-(B), on both end faces of the copper specimen base material (30) copper powder is used as the core material, dipping it in conventional plating liquid, and obtaining a conventional multi-layered porous specimen (31) of 2 mm thickness. On the other hand, as shown in FIG. 5-(A), a specimen according to the present invention having 2 mm of porous layer is obtained by changing the thickness of the coating material (11) to 1, 5 and 10 μm. FIG. 6 shows the results of a tension test using these specimens. FIG. 6 is a characteristic figure that shows the relation between joining strength (Kgf/mm$^2$) and thickness μm of the plating coat. In the figure, (X) shows the characteristics of the specimen joined using the joining method according to the present invention, and (Y) shows the characteristics of the specimen joined using a conventional joining method. As shown in the figure, the joining strength of porous layer (3) with Ni plating coating material (11) is about 20 times larger than the porous layer (31) with conventional copper plating. Furthermore, if the thickness of the coating material (11) is above 5 μm, the joining strength is constant.

Figure 7:
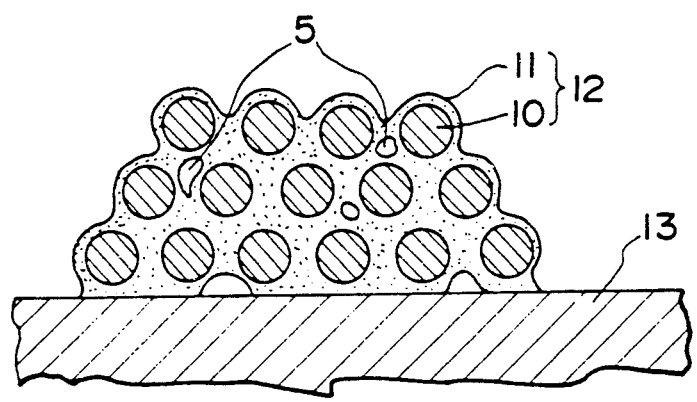
FIGS. 7 through 10 are cross-sectional views of a base material with a porous surface according to another embodiment of the present invention.

Joining the coating treatment material particles (12) to each other and with the heat transfer material (13) when the heating process is performed with a coating thickness of 3, 10, and 50 μm on the core material (10) will now be explained. When the thickness of the coating material (11) is 3 μm, Ni plating coating, which is a coating material (11) of low heat transfer ratio, disappears and the copper surface of the core material, which has higher heat transfer ratio, appears. When the thickness of the coating material is 50 μm, cavities (5) between the coating treatment material are filled with the coating material (11), which results in porous layer with a small number of cavities, as shown in FIG. 7. Therefore, it is necessary for the thickness of the coat to be less than 50 μm, when porous base material according to an embodiment of the present invention is used for an ebullition heat transfer surface.

Figure 8:
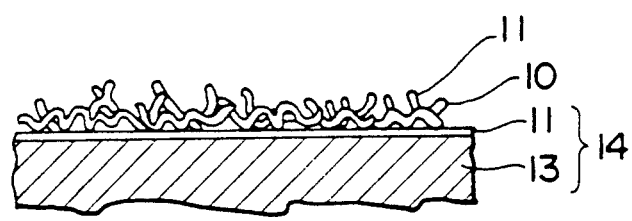

In the above embodiments, powdery core materials (embodiments 1, 2, 3, and 5) and fiber cloth materials (embodiment 4) are used, and fiber strings (in FIG. 8, fibers of stainless net are used) or wire rods can also be used as core material (10) as shown in FIG. 8.

Figure 9:
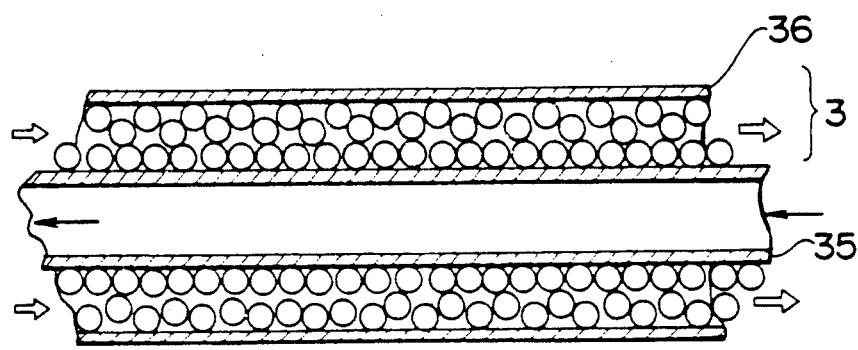

In the above embodiments, the heat transfer material (13) was flat, but the porous layer (3) can be formed on curved surfaces such as a duplex tube as shown in FIG. 9. Such types of duplex tubes can be made in the following manner. The space between the inner tube and the outer tube is filled with coating treatment material (12) covering the core material such as copper particles (10), which are coated with a coating material (11) such as Ni plating, and heat is applied to the whole body to obtain a porous layer (3), thus producing a duplex tube with good heat transfer characteristics.

Figure 10:
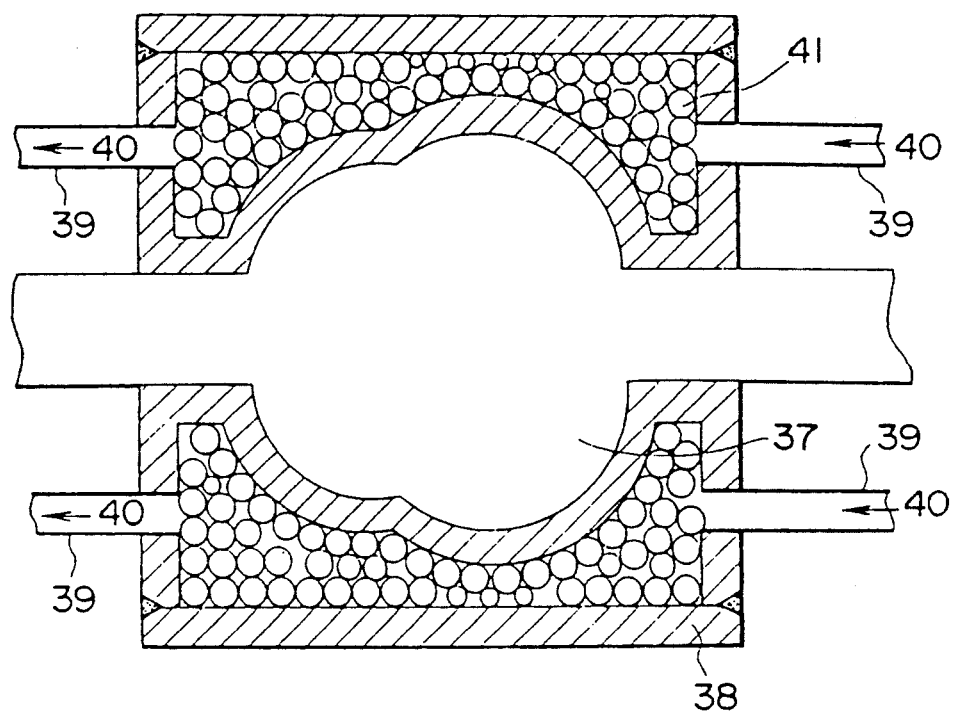

In the above embodiments, manufacturing method for ebullition heat transfer surfaces with a porous layer are shown, however, the heat transfer surface can also be used as a cooling material for injection gold molding (41) as shown in FIG. 10. The coating treatment material (12) is filled between the gold mold frame (38) and resin material, and heat is applied to the whole gold mold frame (38), in order to avoid deformation by the pressure caused by the resin material (not shown in the figure), which enables inexpensive manufacturing of a gold mold frame. Furthermore, the responsiveness of the temperature control supplying the temperature controlling fluid (40) through the temperature controlling passage tube (39) for cooling or heating is increased, and deformation of resin material in the mold region (37) due to pressure is suppressed. Therefore, applications of the heat transfer material with porous surface are not limited to products with characteristics of high heat transfer.

The core material and heat transfer material according to the present invention are made of metal such as copper, iron, stainless steel, nickel and beryllium copper; inorganic material such as glass; and polymer such as styrene.

The coating material according to the present invention must have a lower fusing point than that of the core materials listed above, and Ni plating and silver plating or the like are used.

Figure 11:
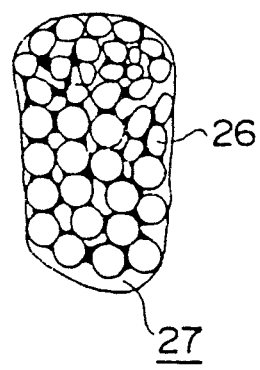
FIG. 11 is a perspective illustration of a reference embodiment.
Figure 12:
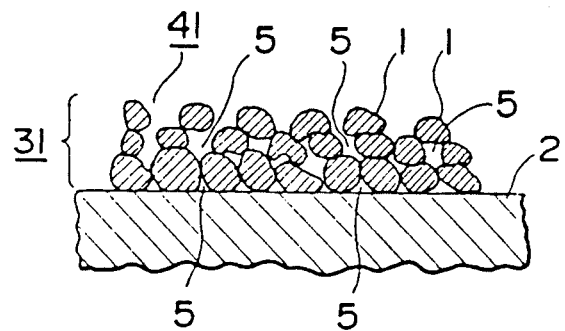
FIGS. 12 and 13 are cross-sectional views of conventional porous heat transfer surfaces.
Figure 13:
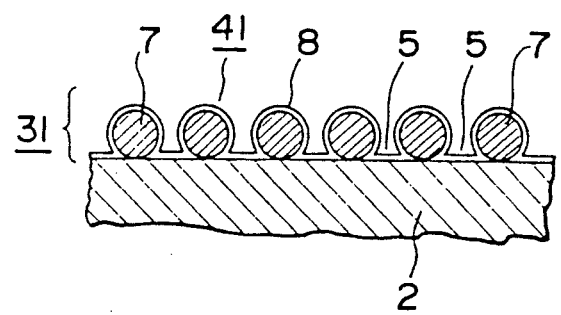

Following the joining method according to the embodiment of the present invention, it is possible to make a porous material (27) by joining two core materials (26) without using a base material as shown if FIG. 11.

In summary, object of the present invention is to obtain a manufacturing method for a base material with porous surface that is suitable for mass-production. Firstly, core material is coated with coating material having a lower fusing point than the core material, in order to obtain a coat treatment material. Secondly, A number of pieces of the coat treatment material are layered on the base material that has a higher fusing point than the coating material. Thirdly, the base material having been layered with coating treatment material is heated to a temperature higher than the fusing point of the coating material, but lower than the fusing point of the core material and the base material. With the heating, the coat treatment material is fused together and with the base material at adjoining points. Thus, the joining becomes strong and can withstand bending, which enables mass-production of the base material with a porous surface.

Another embodiment of the present invention is: firstly, core material is coated with a coating material having a lower fusing point than the core material to form coat treatment material. Secondly, a number of pieces of the coat treatment material are layered on the base material that has a higher fusing point than the coating material. Thirdly, the base material having been layered with coat treatment material is heated to a temperature which is higher than the fusing point of the coating material but lower than the fusing point of the core material and the base material. With heating, the coating material is fused and gathers about the coat treatment material and the adjoining points between the coat treatment material and the base material. Then, a part of the surface of the core material is uncovered and the coat treatment material particles are fused to each other and with the base material at the adjoining points. Thus, a manufacturing method of core material with a porous surface that effectively utilizes the characteristics of the core material is established.

Another embodiment of the present invention is: firstly, core material is coated with a coating material having a lower fusing point than the core material to form coat treatment material. Secondly, A number of pieces of the coat treatment material are layered on the base material that has higher fusing point than the coating material. Thirdly, the base material having been layered with coat treatment material is heated to a temperature which is higher than the fusing point of the coating material but lower than the fusing point of the core material and the base material. With heating, the coating material particles are fused and gather about the coat treatment material and the adjoining points between the coat treatment material and the base material. Then, the coat treatment material particles are fused together and with the base material at the adjoining point without removing the coating. Thus, a manufacturing method of core material with a porous surface that effectively utilizes the characteristics of the core material is established.

A further embodiment of the present invention is: firstly, core material is coated with a coat material having a lower fusing point than the core material to form coating treatment material. Secondly, a number of pieces of the coat treatment material are layered on the base material that has higher fusing point than the coating material. Thirdly, the base material having been layered with coat treatment material is heated to a temperature which is higher than the fusing point of the coating material but lower than the fusing point of the core material and the base material. With heating, the coating material particles are fused and gather about the coat treatment material and the adjoining points between the coat treatment material and the base material. Then, the coat treatment material particles are fused together and with the base material at the adjoining points. Thus, a manufacturing method of core material with a porous surface that has a strong joining force with the base material is obtained.

What is claimed is:

1. A method for manufacturing a base heat transfer material having a porous surface which comprises the steps of:
   (a) coating a metallic core material with a metallic coating material having a lower fusing point than that of said metallic core material so as to form a coat treatment material;
   (b) depositing said coat treatment material on a substrate; and
   (c) heating the coat treatment material to a temperature higher than the fusing point of said coating material but lower than the fusing point of said core material so as to form a base heat transfer material having a porous surface.

2. A manufacturing method according to claim 1, wherein the coat treatment material is deposited on said substrate so as to be layered thereon, and wherein said substrate is flat.

3. A manufacturing method according to claim 2, wherein the core material is in the form of a powder.

4. A manufacturing method according to claim 3, wherein the core material is copper and the coating material is a nickel compound.

5. A manufacturing method according to claim 4, wherein the substrate is copper.

6. A manufacturing method according to claim 4, wherein the coating material is formed by electroless plating.

7. A manufacturing method according to claim 6, wherein before deposition of the coat treatment material, the substrate is also coated with the coating material.

8. A manufacturing method according to claim 1, wherein the coat treatment material fused on said base heat transfer material comprises particles that are fused and joined together, and have uncovered portions of core material.

9. A manufacturing method according to claim 8, wherein the core material comprises particles having a diameter of 0.1 to 0.5 mm, and the thickness of the coating material is about 3 $\mu$m.

10. A manufacturing method according to claim 1, wherein the coat treatment material fused on said base heat transfer material comprises particles that are fused together, with coating material completely covering the surface of the core material.

11. A manufacturing method according to claim 10, wherein the core material comprises particles having a diameter of from 0.1 to 0.5 mm and the thickness of the coating material is about 3 $\mu$m.

12. A manufacturing method according to claim 2, wherein the core material is wire mesh.

13. A manufacturing method according to claim 12, wherein the core material is copper, and the coating material is silver.

14. A manufacturing method according to claim 13, wherein the diameter of the core material is 0.05 to 0.4 mm and the thickness of the coating material is about 3 $\mu$m.

15. A manufacturing method according to claim 14, wherein before deposition of the coat treatment material, the substrate is also coated with a coating material.

16. A manufacturing method according to claim 1, wherein said substrate is formed from a material selected from the group consisting of copper, iron, stainless steel, nickel, beryllium copper alloy, glass and styrene.

17. A method for manufacturing a heat transfer material having a porous surface which comprises the steps of:
   coating a metallic core material with a metallic coating material having a lower fusing point than that of said metallic core material so as to form a coat treatment material;
   depositing said coat treatment material on a metallic substrate; and
   heating said coat treatment material to a temperature higher than the fusing point of said coating material but lower than the fusing point of said core material so as to form a heat transfer material having a porous surface.

18. The method of claim 17, wherein said core material and said substrate are each formed from a metal selected from the group consisting of copper, iron, stainless steel, nickel and beryllium copper alloy.

19. The method of claim 17, wherein the core material is deposited on said substrate in layers.

20. The method of claim 17, wherein the coating material comprises nickel plating or silver plating.

21. The method of claim 20, wherein said core material and said substrate are each formed from a metal selected from the group consisting of copper, iron, stainless steel, nickel and beryllium copper alloy.

22. The method of claim 17, wherein said core material comprises copper particles, said coating material comprises an electroless nickel plating solution, and said substrate comprises copper.

23. The method of claim 22, wherein said core material comprises particles having a diameter of 0.1 to 0.5 mm, and the thickness of the coating material is about 3 $\mu$m.

24. The method of claim 17, wherein said core material is formed from a metal having low corrosion resistance, said coating material is nickel plating and said substrate is formed from a metal having good corrosion resistance.

25. The method of claim 17, wherein said core material is wire mesh.

26. The method of claim 17, wherein before deposition of the coat treatment material, the substrate is also coated with the coating material.

* * * * *